June 1, 1926.
W. R. KAHNS ET AL
STUD FASTENING
Filed Jan. 19, 1925
1,587,330
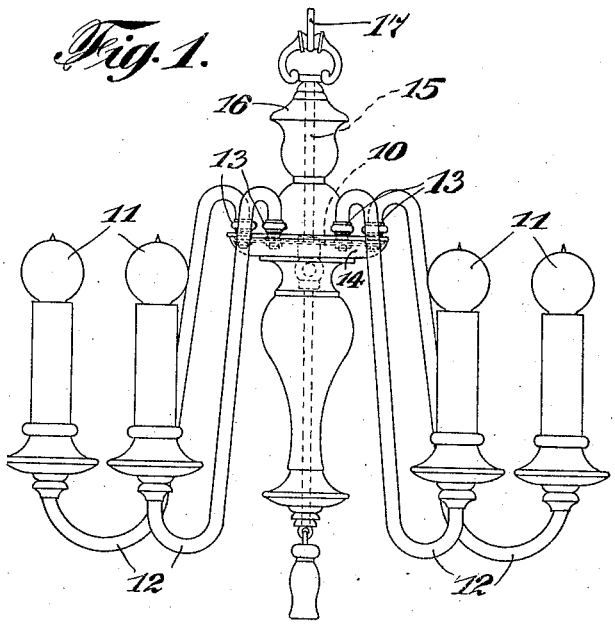
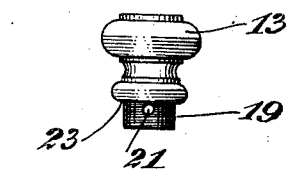
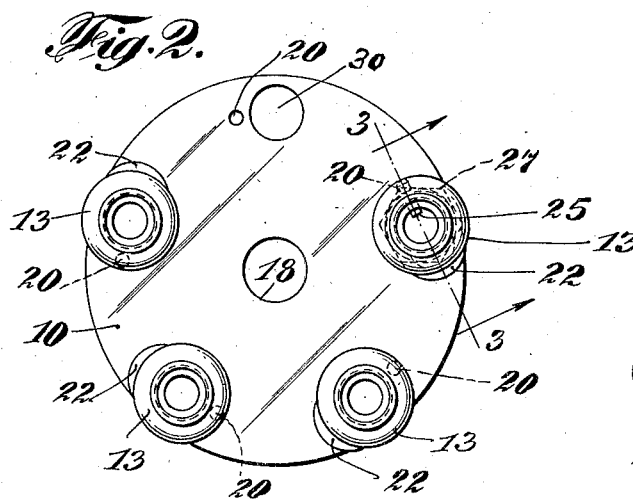
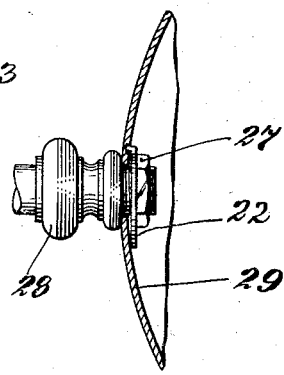
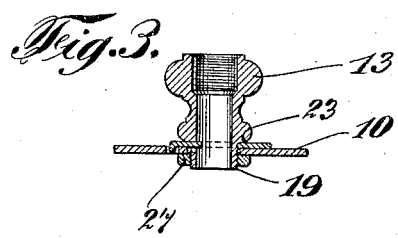
INVENTORS
Walter R. Kahns
and Karl Keller
BY
their ATTORNEYS Patented June 1, 1926.

1,587,330

UNITED STATES PATENT OFFICE.

WALTER R. KAHNS AND KARL KELLER, OF BROOKLYN, NEW YORK, ASSIGNORS TO J. H. WHITE MANUFACTURING COMPANY, OF BROOKLYN, NEW YORK, A CORPORATION OF NEW YORK.

STUD FASTENING.

Application filed January 19, 1925. Serial No. 3,251.

Our invention relates to means for preventing the accidental turning of threaded studs such as are employed for the connection of tubes or pipes, and while particularly designed for use in lighting fixtures, it may be employed in many other cases where threaded studs are used for the connection of arms, tubes or other members. Studs of this character are usually interiorly threaded on one end, and reduced and exteriorly threaded on the other end which passes through an opening in the member to which they are to be attached, and held in place by a lock nut screwed upon the reduced end back of the member to which they are connected.

In lighting fixtures the tubular arms for supporting the lamps are commonly connected at one end to studs of this type, and great difficulty arises in maintaining a proper position of the lamp or lamps on account of the loosening and turning of the studs, which renders the appearance of the fixture very objectionable and unsightly. It is the object of our present invention to provide means for fastening the studs to the object to which they are attached in such manner that they cannot accidentally turn after being attached, thereby overcoming the aforesaid difficulties, assuring the proper position of the lamp, or the relative positions of the lamps in fixtures where a plurality are employed.

The details of the invention are hereinafter particularly described.

In the accompanying drawing:

Figure 1 is an elevation in reduced size of a hanging lighting fixture of the candle type to which our invention is applicable.

Fig. 2 is a top view of the stud disk detached from the fixture, with one of the studs removed.

Fig. 3 is a section on the broken line 4—4 of Fig. 2.

Fig. 4 is an elevation of one of the stud members.

Fig. 5 is a top view of one of the locking members.

Fig. 6 is a side view of the same, and

Fig. 7 is a side view showing our invention applied to a wall bracket, the bracket being partially broken away, and in section.

Similar reference characters denote like parts in all the figures.

Referring to the drawing, 10 indicates a disk for use in a candle fixture such as illustrated in Fig. 1, wherein a plurality of lamps 11 are employed, supported upon the upwardly curved ends of tubular arms 12, the other ends of which are connected to studs 13 attached to the disk. This disk is arranged within the upper part of the shell 14 supported therein in any suitable manner, such as by a vertical rod 15, connected at its lower end to the disk and extending through the center of the ornamental shell 16, its upper end being adapted for connection with the suspending chain 17.

In lighting fixtures of the style shown in Fig. 1 the disk 10 is round and provided with a central hole 18 to receive the supporting rod 15. The disk is also provided with a plurality of equally spaced openings 30 adjacent its outer edge through which the exteriorly threaded ends 19 of the studs pass.

A small hole 20 is provided in the disk at a predetermined distance on one side of each of the openings 30 through which the threaded ends of the studs pass.

There is an opening 21 on one side of the threaded end in each of the studs 13.

22 indicates a lock washer, one of which is used with each of the studs employed, located between the bottom of the flange or shoulder 23 on the stud and the top of the disk 10. Each of these washers is provided with an oblong opening 24, wide enough to allow the free passage of the threaded end 19 of a stud therethrough, there being an integral tongue 25 at one end of the opening, extending inwardly, and a downwardly bent lug 26 on the outer edge of the washer in alignment with the tongue. In use, the tongues 25 enter the holes or openings 21 in the threaded ends 19 of the studs, while the lugs 26, enter the holes 20, in the disk 10.

In assembling the parts the threaded ends of the studs are passed through the oblong openings 24 in the washers behind the tongues 25, with the openings 21 in the threaded ends of the studs in alignment with the tongues, which are then caused to enter such openings by moving the studs forward in the oblong openings in the washers; the threaded ends of the studs are then passed through the spaced openings in the disk and the lugs 26 pressed into the holes 20 in the disk. A lock nut 27 is then screwed on each of the threaded ends of the studs projecting below the disk, thus binding the washers securely between the shoulders 23 on the studs and the disk, whereby the studs are so held that they cannot be turned or moved in any direction without releasing the lock washers.

In Fig. 7 of the drawing, we have shown our invention applied to a wall bracket. In such devices the disk 10 may be dispensed with and the stud 28 secured directly to the bracket back 29, it being only necessary to provide a small hole in the bracket back similar to the holes 20, in the disk 10, to receive the lug 26 of the lock washer 22.

In such cases the lock washer may be placed behind the bracket shell as shown in said Fig. 7.

We claim as our invention:

1. A device of the character described, comprising a socket having a reduced end exteriorly threaded with a hole in one side, a base member with an opening through which the threaded end of the socket is passed and a smaller opening adjacent said first opening, a washer having an opening and integral tongue at one end thereof extending inwardly, a downwardly bent lug on the outer edge of said washer in alignment with said tongue, the opening in the washer being of a size and shape to allow the threaded end of said socket to pass through free of said tongue, said washer being located between the socket and base member, whereby upon moving said socket forward in said opening in the washer, said tongue enters the hole in the threaded end of the socket, while said lug on the washer engages the smaller opening in the base member, and a lock nut screwed upon the threaded end of the socket.

2. A device of the character described, comprising a disk having spaced openings adjacent its outer edge and a smaller opening on one side of each of the larger openings, a plurality of sockets with reduced and exteriorly threaded lower ends each provided with a hole in one side thereof, such threaded ends extending through the larger openings in said disk, a plurality of washers, one located between each of said sockets and said disk, each of said washers having an opening and integral tongue at one end thereof extending inwardly, a downwardly bent lug on the outer edge of each of the washers in alignment with said tongues, the openings in the washers being of a size and shape to allow the threaded ends of the sockets to pass therethrough free of said tongues, whereby upon moving said sockets forward in said openings in the washers, said tongues enter the holes in the threaded ends of the sockets while said lugs on the washers engage the smaller openings in the disk, and a lock nut screwed upon the threaded end of each socket.

Signed by us this 24th day of December, 1924.

WALTER R. KAHNS.
KARL KELLER.